(12) United States Patent
Mancuso et al.

(10) Patent No.: US 11,151,381 B2
(45) Date of Patent: Oct. 19, 2021

(54) PROXIMITY-BASED CONTENT SHARING AS AN AUGMENTATION FOR IMAGERY CAPTURED BY A CAMERA OF A DEVICE

(71) Applicant: Verizon Patent and Licensing Inc., Arlington, VA (US)

(72) Inventors: Steven Mancuso, Lebanon, NJ (US); Kelvin Corniel, Valley Cottage, NY (US); Bharadwaj Vemuri, Bear, DE (US); Pamela Terlizzi, Hoboken, NJ (US); Christopher Lee Rutledge, Somerset, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/363,502

(22) Filed: Mar. 25, 2019

(65) Prior Publication Data
US 2020/0311424 A1    Oct. 1, 2020

(51) Int. Cl.
*G06F 3/0484* (2013.01)
*G06K 9/00* (2006.01)
*G06T 19/00* (2011.01)
*G06F 9/30* (2018.01)

(52) U.S. Cl.
CPC ....... *G06K 9/00671* (2013.01); *G06F 3/0484* (2013.01); *G06F 9/3004* (2013.01); *G06T 19/006* (2013.01)

(58) Field of Classification Search
CPC . G06K 9/00671; G06F 3/0484; G06F 9/3004; G06T 19/006

USPC ......................................................... 345/633
See application file for complete search history.

(56) References Cited

U.S. PATENT DOCUMENTS

| 6,335,731 B1* | 1/2002 | Yamamoto | A63F 13/10 345/420 |
| 2013/0042296 A1* | 2/2013 | Hastings | G06F 21/10 726/1 |
| 2013/0044130 A1* | 2/2013 | Geisner | G09G 5/00 345/633 |
| 2013/0293468 A1* | 11/2013 | Perez | G06F 21/32 345/158 |
| 2014/0006496 A1* | 1/2014 | Dearman | H04L 67/303 709/204 |
| 2015/0007167 A1* | 1/2015 | Mody | G06F 8/61 717/176 |
| 2016/0379409 A1* | 12/2016 | Gavriliuc | G06F 3/011 345/8 |
| 2017/0038829 A1* | 2/2017 | Lanier | H04L 65/403 |
| 2017/0039770 A1* | 2/2017 | Lanier | G06T 19/006 |
| 2018/0047217 A1* | 2/2018 | Skidmore | G06F 3/011 |
| 2018/0052587 A1* | 2/2018 | LaPier | G06F 3/0482 |

(Continued)

*Primary Examiner* — Jin Ge

(57) ABSTRACT

An exemplary augmentation system accesses imagery captured by a sensor of a first device, identifies a user depicted in the imagery, determines that the user is associated with a second device, determines that the second device is located within a predefined proximity range of the first device, accesses, based on the user being depicted in the imagery and the second device being located within the predefined proximity range of the first device, shared content associated with the identified user, and provides the shared content for display as an augmentation for the imagery captured by the sensor of the first device. Corresponding methods and systems are also disclosed.

20 Claims, 9 Drawing Sheets

(56) References Cited

U.S. PATENT DOCUMENTS

2019/0251719 A1* 8/2019 Wang ................... H04W 4/026
2019/0294313 A1* 9/2019 Lee ....................... G06F 1/1694
2019/0297039 A1* 9/2019 Rodriguez .......... H04L 65/1093
2019/0318544 A1* 10/2019 Skidmore ............. H04W 4/023

* cited by examiner

PROXIMITY-BASED CONTENT SHARING AS AN AUGMENTATION FOR IMAGERY CAPTURED BY A CAMERA OF A DEVICE

BACKGROUND INFORMATION

People utilize communication devices (e.g., mobile devices) to share content with one another. The content is conventionally shared on particular digital platforms, such as social networking platforms, in a manner that causes spatial and/or temporal disconnects between the sharing of the content at particular times and from particular real-world locations and the experiencing of the shared content at different times and/or at different real-world locations.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
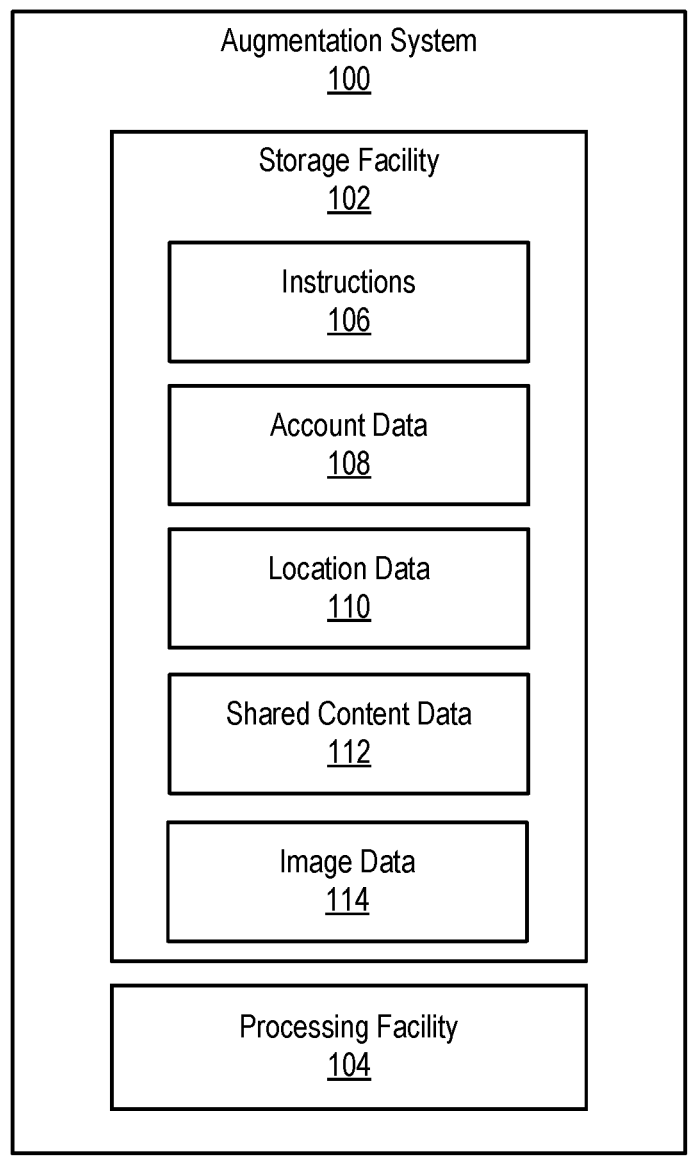
FIG. 1 illustrates an augmentation system according to principles described herein.

Methods and systems for proximity-based content sharing as an augmentation for imagery captured by a sensor, such as a camera of a device are described herein. In certain examples, an augmentation system is provided and is configured to perform operations described herein to facilitate proximity-based content sharing as an augmentation for sensor-captured imagery.

To illustrate an example, users of an augmentation system (e.g., subscribers to a service provided by the augmentation system) may provide (e.g., upload, designate, etc.) content that is to be selectively shared, by the augmentation system, with other users of the augmentation system when the users are physically proximate one to another and as an augmentation to imagery captured by sensors and cameras of devices of the users. When two of the users of the augmentation system are located proximate to one another (e.g., devices of the two users are located within a predefined proximity range of one another), for example, one of the users may operate his or her device to cause the augmentation system to access a camera of the device to capture imagery (e.g., live video) of the real-world environment of the user as the user directs the camera at the real-world environment. The other user may be located within the field of view of the camera and therefore depicted in imagery captured by the camera.

The augmentation system may access the imagery captured by the camera, identify the user depicted in the imagery, determine that the user is associated with a device, and determine that the device of the user is located within a predefined proximity range of the device capturing the imagery. Based on the user being depicted in the imagery and the device of the user being located within the predefined proximity range of the device capturing the imagery, the augmentation system may access shared content associated with the user depicted in the imagery (e.g., shared content that has been provided by the target user for selective, proximity-based sharing by the augmentation system) and provide the shared content for display as an augmentation for the imagery captured by the camera. Accordingly, the user operating the camera device to capture the imagery of the real-world environment may be presented with a view that includes the camera-captured imagery in which the other user (e.g., target user) is depicted and an augmentation of the imagery that includes the shared content associated with the other user.

The augmentation system may provide the shared content as an augmentation of the imagery captured by the camera of the device in various ways, such as by displaying the shared content together with the captured imagery on a display of the device (e.g., within a graphical user interface view displayed by the device). In certain examples, the augmentation system may provide the augmentation as an augmentation overlay (e.g., as a content bubble graphical element) displayed proximate to the depiction of the user within the imagery. The proximate location of the augmentation overlay to the depiction of the user within the imagery may visually indicate a correlation of the shared content to the user depicted within the imagery. Additional or alternative visual indications of the correlation of the shared content to the user may be provided by the augmentation system in other examples.

The augmentation system may be configured to provide various features associated with proximity-based content sharing as an augmentation for camera-captured imagery. Examples of such features, as well as exemplary implementations and uses of the augmentation system, are described herein. The examples are described for illustrative purposes and are not exhaustive.

Methods and systems described herein for proximity-based content sharing as an augmentation for camera-captured imagery may provide various benefits, which may include one or more advantages over conventional content sharing technologies such as conventional social media networking technologies. For example, by basing the sharing of content on physical proximity of users and camera-captured imagery (e.g., live video), an augmentation system may leverage and/or facilitate a real-world connection between users, such as a real-world physical proximity of the users and/or an interaction between the users while the users are located proximate one to another. This may provide various benefits to the users including, but not limited to, an ability to experience (e.g., view and/or interact with) shared content in the same real-life location from where the content is shared and/or at the same time at which the content is shared (e.g., in real time as the content is shared).

In some examples, an augmentation system may advantageously enable a user to experience shared content as an augmentation of camera-captured imagery and seamlessly use the shared content to initiate and/or enhance a real-life interaction (e.g., a person-to-person interaction), which may facilitate users meeting and interacting in person. The augmentation system may also enable a user to simultaneously view a depiction of another user within camera-captured imagery displayed on a device and, via an augmentation of the camera-captured imagery, shared content provided by that user and indicating what that user is thinking, doing, or wanting to express at that moment.

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary augmentation system 100 configured to provide proximity-based content sharing as an augmentation for camera-captured imagery. As shown, augmentation system 100 may include, without limitation, a storage facility 102 and a processing facility 104, selectively and communicatively coupled to one another. It will be recognized that although facilities 102 and 104 are shown to be separate facilities in FIG. 1, facilities 102 and 104 may be combined into fewer facilities, such as into a single facility, or divided into more facilities as may serve a particular implementation.

Facilities 102 and 104 may include or be implemented by computing hardware and/or software components (e.g., processors, memories, communication interfaces, instructions stored in memory for execution by the processors, etc.). Facilities 102 and 104 may be implemented using separate computing components unique to each facility or using shared computing components. Facilities 102 and 104 may be implemented by a single computing device or distributed across multiple computing devices and/or multiple locations as may serve a particular implementation.

The facilities of augmentation system 100 may perform one or more of the operations described herein to provide proximity-based content sharing as an augmentation for camera-captured imagery. To this end, in certain implementations, storage facility 102 may maintain (e.g., store) executable data used by processing facility 104 to perform any of the operations described herein. For example, storage facility 102 may store instructions 106 that may be executed by processing facility 104 to perform any of the operations described herein. Instructions 106 may be implemented by any suitable application, software, code, and/or other executable data instance(s). Storage facility 102 may also maintain any data received, generated, managed, used, and/or transmitted by processing facility 104. Exemplary operations of augmentation system 100 will now be described.

Augmentation system 100 may be configured to register a user with augmentation system 100 such that augmentation system 100 is configured to selectively share content provided by the user with one or more other users of augmentation system 100. As part of a registration process, augmentation system 100 may request and receive data representing or otherwise associated with the user, such as user identification information, user login credentials, biometric information, device information for a device associated with the user, privacy settings for the user, group information indicating one or more groups to which the user belongs or wishes to join (e.g., a group of friends, a group of co-workers, etc.), and any other information associated with the user.

In certain examples, augmentation system 100 may request and receive imagery depicting the user for use by augmentation system 100 to learn to identify the user in other imagery in which the user is depicted. Based on imagery depicting the user that is provided by the user, augmentation system 100 may be configured, in any suitable way, to identify the user when the user is depicted in other imagery. For example, one or more artificial intelligence technologies (e.g., machine learning neural networks, convolutional neural networks, etc.) and/or image-based featured recognition technologies (e.g., facial recognition technologies) may be implemented by and/or used to configure augmentation system 100 to identify a user depicted in the imagery.

In certain examples, a user may provide imagery depicting any other target object to be identified by augmentation system 100 in other imagery. Based on the imagery depicting the object, augmentation system 100 may be configured, in any suitable way, to identify the object when the object is depicted in other imagery. Examples of such objects may include, without limitation, a storefront, a product, a place of interest, etc.

Augmentation system 100 may use the information received from the user to register the user with augmentation system 100, which may include augmentation system 100 creating an account for the user. The account may be represented by data included in account data 108 stored in storage facility 102. The account may contain any information associated with the user, including, but not limited to, information about a device or devices associated with the user (e.g., a device operated by the user and used by the user to interact with augmentation system 100), permissions of the user with augmentation system 100 (e.g., permissions indicating groups and/or other users from which the user is allowed to access shared content, permissions indicating groups and/or other users to which the user wants to share content, etc.), user identification information (e.g., imagery depicting the user, physical traits of the user, etc.), user credentials, etc.

Augmentation system 100 may be configured to request and receive authorization from the user to track a physical location of a device associated with the user. After receiving this authorization, augmentation system 100 may utilize any suitable location tracking technologies to track the physical location of the device of the user. For example, augmentation system 100 may use Global Positioning System (GPS) technologies, radio frequency (RF) based location tracking technologies (e.g., cellular, Wi-Fi, etc. signal-based tracking technologies), image analysis technologies (e.g., imagery-based depth sensing technologies), and/or other suitable location tracking technologies to track the physical location of the device of the user. Location information may be represented by data included in location data 110 stored in storage facility 102. Location data 110 may include information about one or more tracked locations (e.g., historical locations and/or a last-known location) of the device of the user.

Augmentation system 100 may be configured to receive, from the user, content to be selectively shared with other users of augmentation system 100. The user may provide the content to augmentation system 100 in any suitable way. For example, the user may upload digital content to augmentation system 100. As another example, the user may designate a source of the content from which augmentation system 100 may access the content. For instance, the user may provide a uniform resource locator (URL) or other location identifier from which augmentation system 100 may access the content, or the user may provide an application identifier indicating an application from which augmentation system 100 may access the content.

The content provided by the user to augmentation system 100 for sharing may be referred to as shared content and may include content in any form that may be used by augmentation system 100 to share the content with one or more other users of augmentation system 100. In certain examples, the content may be static content that is provided by the user and remains unchanged over time until the content is changed manually by the user (e.g., modified, updated, or replaced by the user). To illustrate, static content may include a textual message, an image, an emoji, a bitmoji, a recorded video clip, and/or any other type of content that remains the same until manually changed by the user. In other examples, the content may be dynamic content that may change without being changed directly or manually by the user. For example, dynamic content may include content that indicates a current status of the user and is determined dynamically based on current user activity and/or status. To illustrate, dynamic content may include a current usage (e.g., a current state of use) of an application installed on the device of the user, which usage may indicate a current status of the user. For instance, the application may be a voice call application installed on the device of the user, and exemplary usages states of the voice call application may indicate whether a voice call is currently active or not. If a voice call is active, the dynamic content may indicate that the user is currently on a voice call. If a voice call is not active, the dynamic content may be different and may indicate other information about the user. As another example, dynamic content may indicate whether the user is using another application (e.g., the user is playing a game application). As another example, dynamic content may be accessed from an integration with an active directory of an enterprise and may include enterprise information such as name, title, presence, etc. of the user. Dynamic content may be dynamic in that the content is dynamically determined at the time the content is accessed and shared by augmentation system 100.

Examples of shared content may include, but are not limited to, text, characters, emojis, bitmojis, avatars, logos, images, animations, gifs, videos, etc. Shared content may be indicative of an expression of a user's mood, an invitation from a user (e.g., an invitation to interact), a status of a user, a user's name, an automatic response (e.g., a do not disturb (DND) message), a dating communication, a response to other user's shared content, an activity of the user, a general comment, a presence of the user (e.g., on, off, dormant, unavailable, etc.), a gaming application status or message, a title for the user, a review, a rating, entertainment content, and a commercial/promotional solicitation. These examples of shared content are illustrative only and not exhaustive.

Augmentation system 100 may be configured to provide robust features for use by the user to provide various instances of shared content to augmentation system 100 for selective sharing with other users of augmentation system 100. Such features may provide the user with the ability to define the content that the user wants to share by way of augmentation system 100 to express the user's mood, feelings, activity, availability, etc. Shared content provided by the user may be represented by shared content data 112 stored in storage facility 102.

Augmentation system 100 may be further configured to provide robust features for use by the user to define how shared content of the user will be shared by augmentation system 100. For example, augmentation system 100 may allow the user to select specific other users and/or specific groups of users that are authorized to access specific instances of shared content. In some examples, the user may specify a first group of users as authorized to access a first instance of shared content and a second group of users as authorized to access a second instance of shared content but not the first instance of shared content. This may allow the user to share specific content with only a group of friends and other specific content with only a group of coworkers, for example. Such sharing criteria may be specified in any suitable way, including by designating shared content as a specific type of content, by designating an audience for the shared content, etc.

Augmentation system 100 may similarly register other users as users of augmentation system 100 and receive shared content from the other users. Accordingly, augmentation system 100 may store account data 108 representing accounts for multiple users, location data 110 representing tracked physical locations of devices of the users, and shared content data 112 representing shared content provided by the users for sharing by augmentation system 100. Augmentation system 100 may be configured to identify depictions of registered users in camera-captured imagery and determine proximities between registered users.

Augmentation system 100 may be configured to use an identification of a user depicted in camera-captured imagery and/or a determination of proximity of users to one another to trigger content sharing as an augmentation of the camera-captured imagery. For example, augmentation system 100 may access imagery captured by a camera of a first device and identify a user depicted in the imagery. The imagery accessed by augmentation system 100 may be represented as image data 114 in storage facility 102, which image data 114 may be processed by processing facility 104 in any suitable way to identify the user depicted in the imagery. For example, processing facility 104 may utilize a trained machine learning model such as a trained neural network and/or any suitable feature recognition technologies such as facial recognition technologies to identify features depicted in the imagery and to identify the depiction of the user in the imagery based on those features. Additionally or alternatively, processing facility 104 may use other information (e.g., information not included in or derived from the camera-captured imagery) to identify the user depicted in the imagery. For example, processing facility 104 may determine from location data that a second device is located proximate to the first device, determine that the second device is associated with a user, and use this information to identify or help identify the user depicted in the imagery.

Augmentation system 100 may determine that the identified user is associated with a second device. Augmentation system 100 may make this determination in any suitable way. For example, augmentation system 100 may access an account of the user and identify the second device from information included in the account.

Augmentation system 100 may determine that the second device that is associated with the identified user is located within a predefined proximity range of the first device. Augmentation system 100 may make this determination in any suitable way. For example, augmentation system 100 may access and use location data 110 to determine locations of the first and second devices and determine that a distance between the first and second devices is within the predefined proximity range. Additionally or alternatively, augmentation system 100 may utilize imagery captured by the camera of the device to determine depth information for points in the imagery and use the depth information to determine that a distance between the first and second devices is within the predefined proximity range. For example, a device may include stereoscopic cameras configured to capture images from stereoscopic viewpoints, and augmentation system 100 may process the stereoscopic images to determine depth information for points in the imagery, such as points associated with a mobile device and/or a user of the mobile device depicted in the imagery. The depth information may be used by augmentation system 100 to determine a distance between the device capturing the imagery and the mobile device or user of the mobile device depicted in the imagery. Additional or alternative location information and/or technologies may be used by augmentation system 100 in other examples to determine whether the first and second devices are within the predefined proximity range of one another. For example, technologies such as GPS technologies, RF-based location tracking technologies (e.g., cellular, Wi-Fi, etc. signal-based tracking technologies), shared access point or Wi-Fi signal strength technologies, Received Signal Strength Indicator (RSSI) from a common transmitter, and/or any other suitable technologies for determining locations of mobile devices may be used.

Based on the user being depicted in the imagery captured by the first device and the second device being located within the predefined proximity range of the first device, augmentation system 100 may access shared content associated with the identified user and provide the shared content associated with the identified user for display as an augmentation for the imagery captured by the camera of the first device. By basing the sharing of the content on the first and second devices being proximate and on the user being depicted in the camera-captured imagery, augmentation system 100 may selectively facilitate content sharing and experiencing that is not disconnected by different times and/or geographies.

In certain examples, before sharing the content, augmentation system 100 may determine whether a user associated with the first device is authorized to receive the shared content associated with the identified user of the second device. Augmentation system 100 may make the determination in any suitable way, including by accessing and checking permissions of the first user and/or defined sharing policies of the second user and/or the shared content. In response to augmentation system 100 determining that the user of the first device is authorized to receive the shared content, augmentation system 100 may provide the shared content associated with the identified user for display as an augmentation for the imagery captured by the camera of the first device. Examples of shared content as augmentations of camera-captured imagery are described herein.

Figure 2:
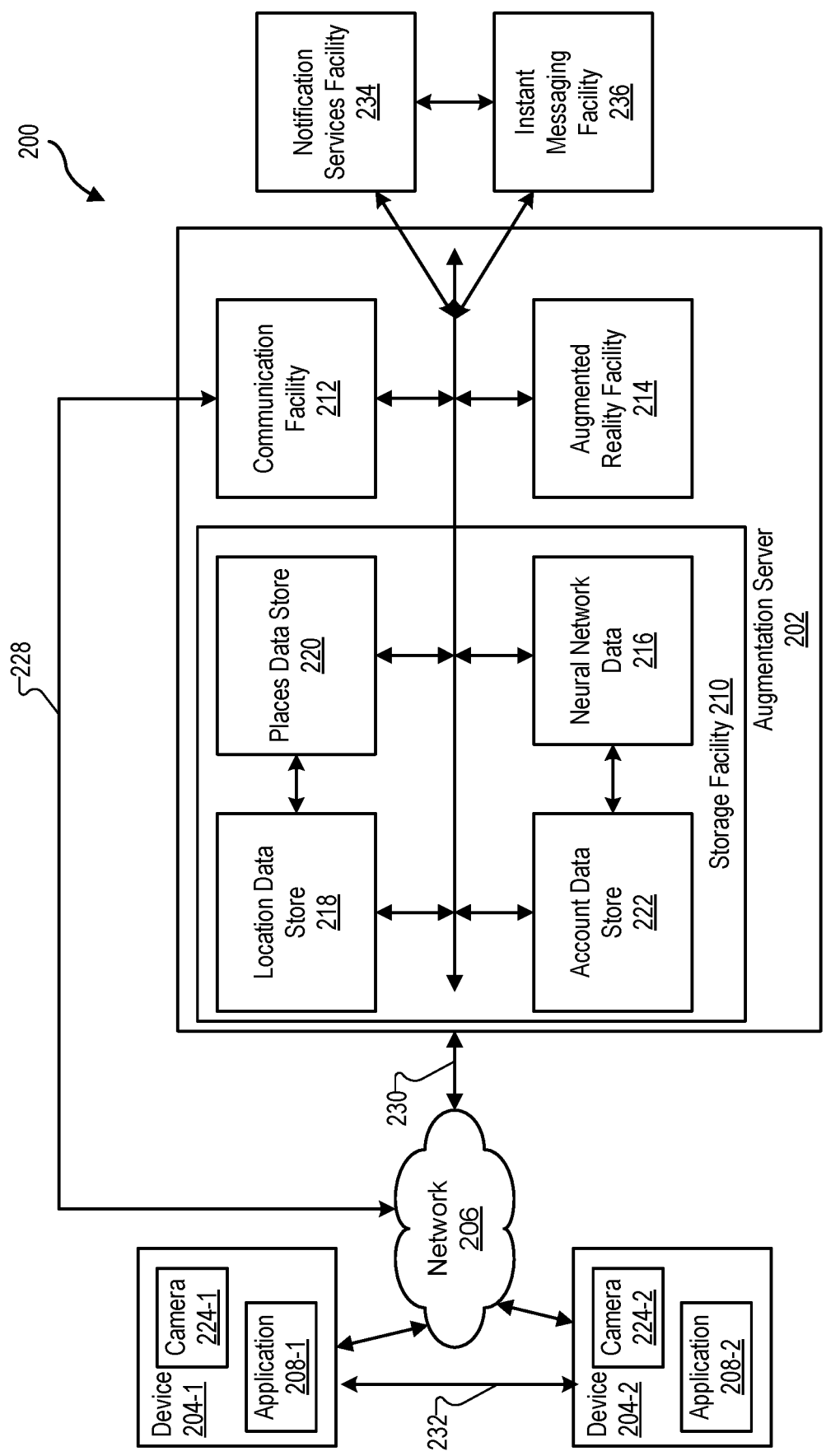
FIG. 2 illustrates an exemplary system configuration in which the augmentation system of FIG. 1 is implemented according to principles described herein.

FIG. 2 illustrates an exemplary system configuration 200 in which augmentation system 100 is implemented. As shown, system configuration 200 may include an augmentation server 202 communicatively coupled to devices 204 (e.g., devices 204-1 and 204-2) by way of a network 206. Augmentation system 100 may be implemented by components of system configuration 200 in any suitable way. For example, augmentation system 100 may be implemented entirely by augmentation server 202 or distributed across augmentation server 202 and devices 204. In certain implementations, for example, augmentation system 100 may be partially implemented by augmentation server 202 and partially implemented by applications 208 (applications 208-1 and 208-2) installed on devices 204.

Network 206 may include a wireless local area network (e.g., a Wi-Fi network), a provider-specific wired or wireless network (e.g., a cable or satellite carrier network, a mobile telephone network, a cellular network such as a 4G or 5G cellular network, etc.), the Internet, a wide area network, a content delivery network, and/or any other suitable network or networks. Accordingly, data may flow between augmentation server 202 and devices 204 by way of network 206 using any suitable communication technologies, devices, media, and protocols as may serve a particular implementation.

Augmentation server 202 may include or be implemented by computing hardware and/or software components (e.g., processors, memories, communication interfaces, instructions stored in memory for execution by the processors, etc.). For example, augmentation server 202 may include or be implemented by one or more physical computing devices configured to perform the operations of augmentation server 202 described herein.

Augmentation server 202 may include a storage facility 210, a communication facility 212, and an augmented reality facility 214. It will be recognized that although facilities 210 through 214 are shown to be separate facilities in FIG. 2, facilities 210 through 214 may be combined into fewer facilities, such as into a single facility, or divided into more facilities as may serve a particular implementation. In some examples, facilities 210 through 214 may be distributed between multiple devices and/or multiple locations as may serve a particular implementation.

Each of facilities 210 through 214 may include or be implemented by computing hardware and/or software components (e.g., processors, memories, communication interfaces, instructions stored in memory for execution by the processors, etc.). The facilities may be implemented using separate computing components unique to each facility or may be implemented using shared computing components.

Storage facility 210 may maintain any data received, generated, managed, used, and/or transmitted to/by augmentation server 202. For example, as shown, storage facility 102 may maintain neural network data 216, and may further maintain data within a location data store 218, a places data store 220, and an account data store 222.

Neural network data 216 may include data representing a neural network configured to execute a machine learning model trained to identify one or more users depicted in captured imagery. In certain examples, the neural network may include an input layer, any suitable number of hidden layers, and an output layer. The neural network may be a convolutional neural network, a residual convolutional neural network, or any other suitable neural network. In an example, the neural network may include any suitable machine learning model, such as a deep learning machine learning model, configured or configurable to identify users depicted within imagery captured by a camera of a device. In certain examples, the users identifiable by a neural network may include, but are not limited to, users who have accounts with augmentation system 100. While augmentation server 202 may utilize an appropriately trained neural network to identify users depicted within captured imagery in certain implementations, any suitable object recognition technologies (e.g., any suitable machine learning technologies and/or other feature recognition technologies such as facial recognition technologies) may be used by augmentation server 202 to identify users depicted in captured imagery in other implementations.

Location data store 218 may store any data representing and/or otherwise associated with locations of devices 204 of users of augmentation system 100. Augmentation server 202 may track locations of devices 204 in any suitable way, including by receiving location data from devices 204 by way of network 206 and/or deriving location data from data received from devices 204 by way of network 206. The location of a device 204 may represent a location of a user of the device 204. Alternatively, the location of a device 204 may be compared to the location of the user associated with the device 204 to verify the location of the user.

Places data store 220 may store data representing designated points of interest. Such data may include an identification of different points of interest and locations of the points of interest. In an example, points of interest may be any suitable landmarks identifiable by augmentation system 100 and/or geographic locations that have been defined by users of augmentation system 100 as locations configured to trigger content sharing to users located proximate to the locations (e.g., within a geographic area associated with a location).

Account data store 222 may store account data representing accounts of users with augmentation system 100. For example, account data store 222 may store any of the exemplary account data described herein, such as user profile data like devices associated with a user, physical characteristics of the user, images of the user, authorization settings of the user, content sharing permission settings of the user, etc.). In certain implementations, account data store 222 may also store data representative of shared content provided by users of augmentation system 100. The shared content may be included in or otherwise associated with accounts of users who provided the shared content.

In certain examples, augmentation server 202 may include or be at least partially implemented as one or more network edge servers having an ultra-low latency network communication connection with devices 204. As used herein, an ultra-low latency communication connection may refer to a network connection or other communicative coupling between computing devices that allows data to travel between the devices in less time than users of the devices are readily capable of perceiving. For example, ultra-low latency communication connections may provide round-trip processing and transmission delays of a few milliseconds (e.g., less than about 10-50 milliseconds in certain examples). Such ultra-low latency communication connections may be established by way of mobile edge computing ("MEC") technologies employed on 5G cellular data networks, or by way of other suitable technologies. By implementing augmentation server 202 with high capacity computing resources at a network edge server having an ultra-low latency network connection with devices 204, augmentation server 202 may provide off-device network-based user identification and augmentation of imagery in a manner that supports shared content being provided between users (e.g., in real time as live video is captured and displayed by devices 204).

Devices 204 may include any suitable computing devices configured to perform operations of devices 204 described herein, including interfacing with augmentation system 100, such as by executing applications 208 and/or communicating with augmentation server 202 by way of network 206. Devices 204 may include cameras 224 (e.g., cameras 224-1 and 224-2) or other sensors configured to capture imagery of the real-world environment of devices 204. Devices 204 may further include displays configured to display the imagery captured by cameras 224 (e.g., in real time as the imagery is captured). In certain examples, a device 204 may include a tablet device, a wearable computing device, a cellular telephone device, a smartphone device, an augmented reality device (e.g., an augmented reality headset), or the like.

Devices 204 may include applications 208 installed and executed on devices 204 to direct devices 204 to perform any of the device operations described herein. In certain implementations, applications 208 may be dedicated and standalone shared content augmentation applications configured to access and use resources of devices 204 to perform operations described herein. For example, applications 208 may be configured to access and control operations of cameras 224 of devices 204 to capture imagery of the real-world environment of devices 204 and to access and control operations of displays of devices 204 to display the camera-captured imagery augmented with shared content as described herein.

In certain other implementations, applications 208 may be implemented as components of other applications installed and executed on devices 204. For example, an application 208 may be a plug-in to another application such as a camera application, an augmented reality application, or a social-networking application installed and executed on a device 204. This may allow the application 208 to leverage an existing application, such as application data representing contacts, groups, (e.g., social networking contacts, enterprise contacts, customers, clients, employees), etc. of the user.

Devices 204 executing applications 208 may authenticate to augmentation server 202 using any suitable authentication technologies. Similarly, augmentation server 202 may employ any suitable authentication technologies to authenticate devices 204 and/or users of devices 204 before providing access to features and/or operations of augmentation system 100.

Devices 204 executing applications 208 may communicate with augmentation server 202 by way of network 206 using any suitable data communications technologies (e.g., protocols, connections, channels, etc.). Examples of such communications technologies may include cloud messaging protocols and channels, video streaming, chatting, and/or delivery protocols and channels, notification services, instant message services, application program interfaces, etc.

In an example, a device 204 may execute an application 208 and communicate with augmentation server 202, via network 206, to authenticate in any suitable way to an account with augmentation server 202. For example, upon launching the application 208, the device 204 may initiate communication with communication facility 212 of augmentation server 202 via any communication channel (e.g., a communication channel 228 such as a cloud messaging channel) over network 206, and provide authentication information to augmentation server 202. In an example, authentication information may be provided via an application program interface (API) of communication facility 212. Authentication information may include a username and password, biometric information for a user associated with the account, a token, or any other credential or credentials that may be used to authenticate a user and/or a device to augmentation server 202.

Based on account authentication, the device 204 may begin communicating with augmentation server 202 via any suitable communication channel over network 206. For example, the device 204 may communicate with augmentation server 202 via a communication channel 230. In an example, communication channel 230 may connect augmentation server 202 to network 206 via a gateway, such as an API gateway, of augmentation server 202.

In certain examples, if a user is utilizing application 208 to connect (e.g., register and/or log on) to augmentation server 202 for a first time, the user may perform, in any suitable manner, an account setup or registration process. In an example, a user may utilize application 208 to upload account information to augmentation server 202, which in turn may store the account information in account data store 222. The account information may include any suitable data including, but not limited to, a username, a password, a profile picture, and personal settings. Personal settings may be any suitable settings to control different aspects of a user's account that may vary from one user to another. For example, personal settings may include permissions that control what shared content is shared with which other users (e.g., a selection of groups of users that may have access to particular shared content), communication preferences, privacy settings that specify what account information and/or shared content may be made public, or the like.

During the account setup process, augmentation server 202 may receive, via application 208 of device 204, one or more images of the user that may be utilized in any suitable way for identification of the user in imagery. Augmentation server 202 may be configured to utilize the image(s) of the user to identify, from imagery, a depiction of the user in the imagery. In an example, augmentation server 202 may execute one or more training sessions to train a neural network capable of machine learning. A training session may be performed in any suitable way. For example, augmentation server 202 may submit one or more sets of images of a user, such that the neural network model learns to identify the user in imagery. In certain examples, images of the user may include multiple images of the user's face captured from different angles and directions. In an example, the trained neural network may be stored within neural network data 216.

After completion of the account setup process and upon subsequent authentications, a user may utilize the application 208 of the device 204 to provide, in any suitable manner, shared content as content to be shared with other users of augmentation system 100. The user may indicate to whom the shared content is allowed to be shared, such as by selecting a specific user or group of users allowed to access the shared content and/or by selecting sharing policies to be applied to the shared content.

In some examples, the user associated with the device 204 may set any suitable policy for shared content provided to augmentation server 202 by the user. For example, a privacy policy may be set for the provided shared content, such as by the user selecting from a set of defined privacy policies that includes a public privacy policy and a private privacy policy. In an example, the public privacy policy may allow any user of augmentation system 100 to access and experience shared content, and the private privacy policy may allow only a select subset of the users of augmentation system 100 to access and experience the shared content. Additionally, the policies for shared content may include one or more filters to determine visibility of shared content (via an augmentation overlay) based on any suitable information including, but not limited to, user age and/or type of shared content (e.g., advertisement or personal content). Furthermore, the policies for shared content may include time-of-day constraints, location constraints, time duration constraints (e.g., lengths of time the shared content is available), and permitted integrations with other applications.

In certain examples, after completion of the account setup process and upon subsequent authentications, augmentation server 202 may determine, in any suitable manner, a location of a device 204 executing an application 208). The location may be determined in any suitable way including, but not limited to, a determination that the device 204 entered a specific geographic region (e.g., a geofence), GPS data for the device 204, a determination based on communication between the device 204 and cellular towers, an analysis of Wi-Fi signals received by the device 204, and a determined proximity range of the device 204 to a particular point-of-interest. Upon determining a location for the device 204, augmentation server 202 may store the location of the device 204 in location data store 218. In an example, augmentation server 202 may continue to monitor the location of the device 204 and store any changes within location data store 218.

In certain examples, augmentation server 202 may utilize any suitable data to determine whether two or more devices 204 (e.g., devices 204-1 and 204-2) executing instances of application 208 are within a predefined proximity range of one another. For example, augmentation server 202 may access the geographic locations for the devices 204 from location data store 218 and perform one or more operations based on the geographic locations for the devices 204 to determine whether the devices 204 are within a predefined proximity range of one another. Arrow 232 in FIG. 2 represents a proximity range between the devices 204. Augmentation server 202 may compare the geographic locations of the devices 204 and determine whether the proximity range (e.g., a distance) between the geographic locations satisfies a predefined threshold proximity range (e.g., a threshold distance). If augmentation server 202 determines that the devices 204 are not within the threshold proximity range, augmentation server 202 may continue to monitor the geographic locations of the devices 204 and determine whether the proximity of the devices 204 ever satisfies the threshold proximity distance. If augmentation server 202 determines that the proximity of the devices 204 satisfies the threshold proximity range, augmentation server 202 may determine that devices 204 are located within a predefined proximity range of each other. In an example, the predefined proximity range may be set in any suitable manner and based on any suitable criteria including, but not limited to, network limitations (e.g., limitations of network 206), application limitations, and personal settings (e.g., settings determined by users).

Based on an identification of one or more target users in imagery captured by one or more devices 204 and a determination that the devices 204 are within a predefined proximity range of each other, augmentation server 202 may allow shared content to be shared between the users of the device 204 and used to augment imagery captured by one or more of devices 204 and depicting the users. Examples of such content sharing between users of proximately located devices will now be described.

In an example, a user of device 204-1 may utilize camera 224-1 of device 204-1 (e.g., through application 208-1) to capture imagery of a surrounding area. The captured imagery of the area surrounding the user of device 204-1 may depict a user of device 204-2. Augmentation server 202 may access and use the captured imagery to identify the user depicted in the imagery in any suitable manner. In an example, application 204-1 may provide the captured imagery to augmentation server 202, which may perform one or more operations on the imagery to identify the user depicted within the imagery. For example, augmentation server 202 may provide the imagery as input to a trained neural network represented by neural network data 216, and the neural network may output an identification of the user depicted within the imagery or data from which an identification of the user depicted within the imagery may be derived by augmentation server 202.

Based on the identification of the user depicted within the imagery, augmentation server 202 may perform one or more operations to identify shared content that is associated with the identified user (e.g., content that has been provided by the identified user to augmentation system 100 for sharing by augmentation system 100). For example, augmentation server 202 may identify shared content that is associated with an account of the identified user, shared content that is associated with one or more devices associated with the identified user (e.g., shared content associated with device 204-2), etc.

Augmentation server 202 may identify a device associated with the identified user in any suitable way. For example, augmentation server 202 may access account data store 222 to retrieve data representative of one or more devices associated with the identified user. Accordingly, augmentation server 202 may utilize account data for the user to identify device 204-2 as being associated with the user. As another example, augmentation server 202 may use location data and/or distance data associated with devices to identify a device that is associated with the identified user, such as a device (e.g., device 204-2) that is in close geographic proximity to the user. For instance, augmentation server 202 may compare a first distance between devices 204-1 and 204-2, which distance is determined based on location data for devices 204-1 and 204-2, and a second distance between device 204-1 and the identified user, which distance is determined based on the captured imagery. If the compared distances are within a predefined threshold of one another, augmentation server 202 may determine device 204-2 to be associated with the identified user.

In an example, augmentation server 202 may identify device 204-2 as being associated with the identified user based on device 204-2 having a location stored in location data store 218 that is nearest, compared to locations of other devices stored in location data store 218, to the location of the identified user and that is within a predefined distance of the identified user. The association of the user with device 204-2 may be utilized by augmentation server 202 to verify the location of device 204-2 and to verify that device 204-2 is within a predefined proximity range of device 204-1.

Based on an identification of the user depicted in the captured imagery and a determination that device 204-2 associated with the identified user is located within a predefined proximity range of device 204-1, augmentation server 202 may access, in any suitable manner, shared content associated with the identified user and provide the shared content to device 204-1. For example, augmentation server 202 may provide the shared content associated with the identified user to device 204-1 for display together with the imagery captured by camera 224-1 of device 204-1, such as by transmitting data representative of the shared content to device 204-1 for use by application 208-1 to augment a display of the captured imagery in a graphical user interface view that is displayed by device 204-1.

Augmentation server 202 may provide the shared content to device 204-1 in any suitable way. As an example, augmentation server 202 may access the shared content from a data store included in augmentation server 202 (e.g., a data store in storage facility 210) or a data store communicatively coupled to augmentation server 202 (e.g., a data store of device 204-2 or a network data store) and transmit the shared content to device 204-1 using any suitable form of communications. As another example, augmentation server 202 may facilitate peer-to-peer sharing of the shared content from device 204-2 to device 204-1, such as a peer-to-peer data transfer or messaging between application 208-2 and application 208-1.

Augmentation server 202 may identify shared content as being associated with the identified user in any suitable way. For example, augmentation server 202 may access and use account data for the user to identify shared content that has been provided by the user for sharing by augmentation server 202. As another example, augmentation server 202 may request and receive the shared content from device 204-2 in response to the determination that device 204-2 is associated with the identified user and is within a geographic proximity range of device 204-1.

In certain implementations, augmentation server 202 may selectively provide or not provide shared content based on permission settings. For example, augmentation server 202 may determine, in any suitable way, whether a user associated with device 204-1 is authorized to receive shared content provided by the user identified in captured imagery. If the user associated with device 204-1 is unauthorized to receive the shared content, augmentation server 202 may prevent the shared content from being provided to and displayed by device 204-1. However, if the user associated with device 204-1 is authorized to receive the shared content, augmentation server 202 may provide the shared content to device 204-1 for presentation together with imagery captured and displayed by device 204-1 in a graphical user interface view of a user interface of device 204-1. In other implementations, shared content, or certain shared content may be publicly available such that augmentation server 202 does not check whether a user is authorized to access the shared content before providing the shared content for use by a device associated with the user for augmenting a display of captured imagery.

Augmentation server 202 may be configured to provide messages such as notifications to devices 204. In certain examples, augmentation server 202 may be configured to provide a notification to devices 204 based on a determination that devices 204 are located within a predefined proximity range of each other. In some implementations, such a notification may be provided regardless of the statuses of use of applications 208 on devices 204 (e.g., whether applications 208 are open or executing in the background). In other implementations, such a notification may be provided to a device 204 only when the application 208 on the device 204 is open and/or actively being used on the device 204 (e.g., only when the application 208 is open and imagery of a surrounding area is being captured by a camera 224 of the device 204). A notification provided by augmentation server 202 may indicate to one or both of devices 204 that a nearby device 204 is executing application 208. For example, augmentation server 202 may provide a push notification in any suitable way to devices 204-1 and/or 204-2 indicating that another device 204 is nearby and executing application 208.

Augmentation server 202 may provide a notification to a device 204 in any suitable way. For example, augmentation server 202 may access a notification services facility 234, which in turn may provide a notification to one or more of device 204-1 and device 204-2 to indicate that another device 204 executing application 208 is nearby and available for content sharing. For example, the notification may be provided from notification services facility 234 via communication facility 212 and communication channel 228, or directly from notification services facility 234 to device 204-1 and/or device 204-2.

In additional or alternative examples, augmentation server 202 may access an instant messaging facility 236, which in turn may provide an instant message notification to one or more of devices 204-1 and 204-2 to indicate that another device 204 executing application 208 is nearby and available for content sharing. For example, the instant message may be provided to device 204-1 and/or device 204-2 from instant messaging facility 236 directly or via communication facility 212 and communication channel 228.

Augmentation server 202 may be configured to provide additional or alternative notifications to devices 204, which may include using notification services facility 234 and/or instant messaging facility 236 to provide those notifications to the devices 204. Examples of other notifications include, without limitation, a communication request (e.g., a message sent from another user, a chat request sent from another user, etc.), a reminder, a coupon, an emergency alert for a geographic area, a suggested user/friend, etc.

In certain examples, a notification from augmentation server 202 to a device 204 indicating that another device 204 is proximate and available for content sharing may be configured to facilitate a user of the device 204 to launch application 208 and/or camera 224 of the device 204 to capture imagery of the surrounding area such that the imagery may be augmented with shared content when another user of augmentation system 100 is depicted in the imagery. For example, based on the reception of a notification, a device 204 may display the notification in a user interface view of the device 204. The notification may prompt a user to utilize a camera 224 of the device 204 to capture imagery of a surrounding area and/or to direct the camera 224 of the device 204 in a particular direction and/or at a particular location. In other examples, a user of a device 204 may utilize a camera 224 of the device 204 to capture imagery of a surrounding area without the device 204 receiving a notification and without the user being prompted by a notification.

Augmentation system 100 may provide shared content as an augmentation of camera-captured imagery in any suitable way. For example, shared content may be provided as an augmentation overlay for imagery captured and displayed by device 204-1. The augmentation overlay containing the shared content may be provided over the top of the captured imagery, may be integrated within the captured imagery, or otherwise used to augment the captured imagery in any other suitable manner. In an example, device 204-1 may access the shared content from augmentation server 202 or another device 204 (e.g., device 204-2), and application 208-1 of device 204-1 may render augmented imagery that includes imagery captured by camera 224-1 augmented with the shared content. In additional or alternative examples, rendered augmented imagery may be provided by augmented reality facility 214 of augmentation server 202 to device 204-1, which may display the rendered augmented imagery with the shared content provided as an augmentation overlay for the imagery captured by camera 224-1. An augmentation overlay may be provided in any suitable format including, but not limited to, a graphical element containing text (e.g., a text bubble), a video clip, and an image (e.g., a gif image).

In certain examples, augmentation system 100 may be configured to provide shared content having specific visual attributes that may vary based on any suitable factors. For example, attributes of a presentation of the shared content as an augmentation overlay may vary depending on privacy settings for the shared content. For instance, visibility, shading, transparency, or coloring of an augmentation overlay may vary based on whether the user associated with device 204-1 is authorized to view the shared content and/or based on a defined relationship between the user of device 204-1 and the user identified in the captured imagery. In additional or alternative examples, attributes of a presentation of the shared content as an augmentation overlay may vary depending on the type of shared content. For example, visibility, shading, transparency, or coloring of the augmentation overlay may vary depending on a type of shared content. The type of shared content may include, but is not limited to, shared content designated to be personal shared content, business shared content, enterprise shared content, and hybrid shared content (shared content that is designated as both personal and business shared content).

To illustrate, a user of device 204-1 viewing augmentation overlays of camera-captured imagery may see an opaque content bubble that represents shared content the user is not authorized to access, a shaded content bubble that represents shared content the user may request permission to access, and/or a clear content bubble containing visible shared content that the user is authorized to access. To illustrate another example, a user of device 204-1 viewing augmentation overlays of camera-captured imagery may see a content bubble having a first color that represents shared content associated with a first type of content (e.g., personal or friend type content) and a content bubble having a second color that represents shared content associated with a second type of content (e.g., work-related or corporate enterprise type content).

In certain examples, an application 208 of a device 204 may display, in any suitable manner, multiple augmentation overlays for imagery captured by a camera 224 of the device 204. The multiple augmentation overlays may be representative of shared content from one user of another device 204. For example, the user of the other device 204 may have provided multiple instances of shared content for sharing by augmentation system 202. The user of the device 204 capturing the imagery may be authorized to receive multiple instances of the shared content provided by the user of the other device 204. Accordingly, multiple augmentations overlays representing the multiple instances of shared content may be concurrently presented as augmentations to the imagery captured by the device 204. In certain example, augmentation system 100 may provide one or more features configured to be used by the user of the device 204 to navigate (e.g., scroll) through and/or select, from the multiple augmentation overlays, an augmentation overlay for viewing and/or interaction.

In other examples, multiple augmentation overlays that are concurrently displayed with captured imagery may be representative of multiple instances of shared content provided by different users of other devices 204. For example, more than one user depicted within imagery captured by camera 224-1 of device 204-1 may be identified, and shared content associated with the multiple users may be concurrently provided as multiple different augmentation overlays (e.g., one distinct augmentation overlay for each identified user). Thus, multiple augmentation overlays, for one or more identified users, may be concurrently displayed together with imagery captured and displayed by device 204-1.

In certain examples, augmentation system 100 may provide one or more features configured to be used by the user of the device 204 to navigate (e.g., scroll) through and/or select, from the multiple augmentation overlays, an augmentation overlay for viewing and/or interaction. For example, multiple content bubbles associated with different users depicted in the captured imagery may be displayed with different depths that are based on depths of the depictions of the users in the imagery. Thus, a content bubble of a user who is close to camera 224-1 may be represented more to the forefront of the display than is a content bubble of a user who is farther from camera 224-1. Such differences in distances from camera 224-1 to users depicted in imagery may be used to arrange (e.g., stagger) content bubbles of the users. A user of the device 204 may provide input to scroll augmentation overlays having different display depths that are based on depths of depictions of different users from front to back and/or from back to front. Using such input, the user may select to bring one augmentation overlay to the forefront of the other augmentation overlays and/or may select one augmentation overlay with which to interact.

A displayed augmentation overlay of shared content may be linked to the identified user depicted within the imagery captured by camera 224 in any suitable manner. For example, a visual link such as a line between the augmentation overlay and the depiction of the user, an arrow from the augmentation overlay to the depiction of the user, and an overlay position of the augmentation overlay proximate to (e.g., overlapping) the depiction of the user may be displayed with the augmented imagery.

Examples of augmentation overlays displayed together with camera-captured imagery will now be described. Certain examples will be described in reference to exemplary illustrations of graphical user interface views that may be displayed by a device such as a device 204.

Figure 3:
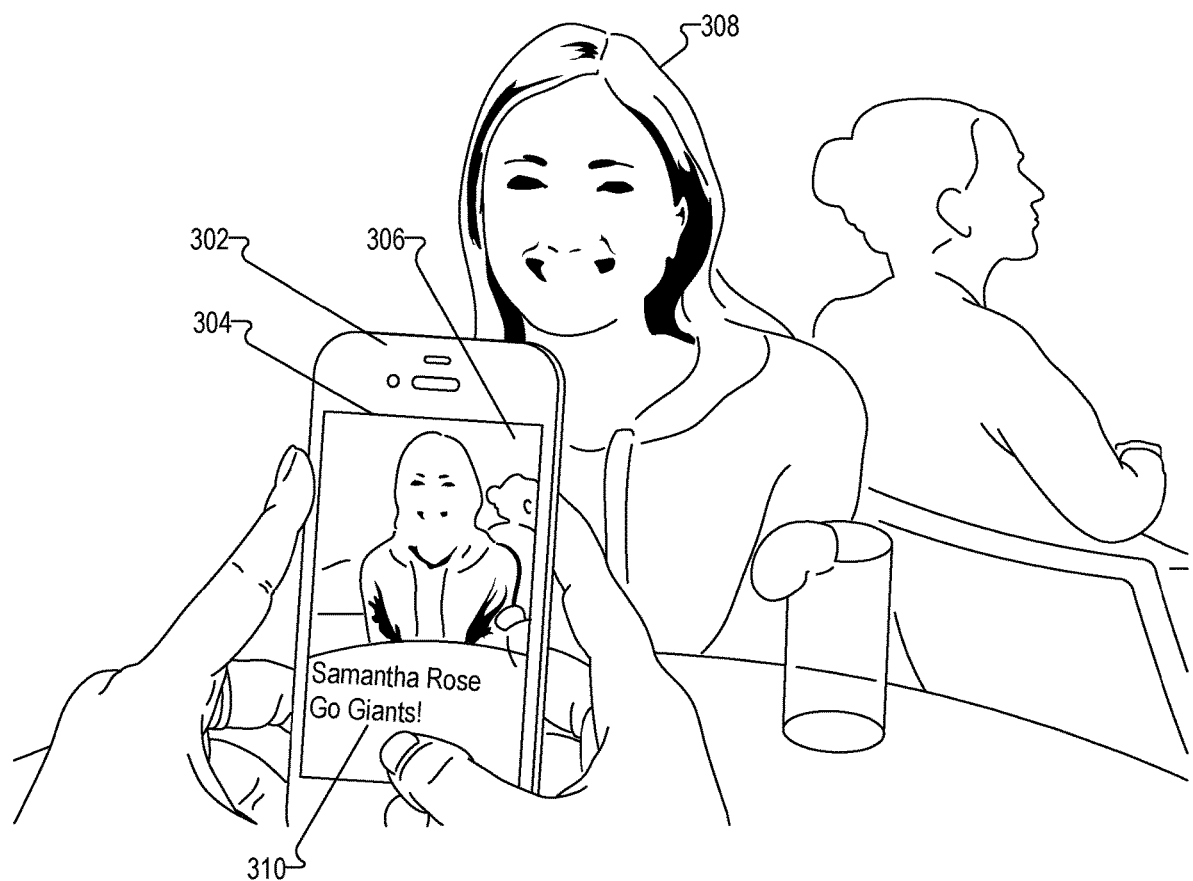
FIG. 3 illustrates an exemplary device with shared content presented as an augmentation overlay for imagery captured by a camera of the device according to principles described herein.

FIG. 3 shows a device 302 having a display screen 304 displaying captured imagery of a surrounding area in a graphical user interface view 306. In an example, a user 308 may be depicted within the imagery captured and displayed by device 302. Augmentation system 100 may determine that the user depicted in the imagery is associated with another device (e.g., device 204 of FIG. 2). The determination that the user 308 depicted within the imagery is associated with another device may be performed in any of the ways described above.

In certain examples, augmentation system 100 may determine that the other device is located within a predefined proximity range of device 302. This determination may be made in any suitable way, including any of the ways described above. Based on the identification of the user depicted in the imagery and the determination that the other device (e.g., a device 204 of FIG. 2) is located within the predefined proximity range of device 302, augmentation system 100 may access shared content associated with the identified user and provide the shared content as an augmentation overlay 310 for the imagery captured by the camera of device 302 and displayed in graphical user interface view 306 of display screen 304. A location of augmentation overlay 310 within graphical user interface view 306 may be any suitable location relative to the depiction of the user in the imagery, including, but not limited to, directly overhead of the depiction of the user and/or within a predefined proximity of the depiction of the user.

As shown in FIG. 3, augmentation overlay 310 may display shared content provided to augmentation system 100 by user 308. In the illustrated example, the shared content that is displayed in augmentation overlay 310 indicates an identifier (e.g., a name, a username, etc.) for user 308 and a message (e.g., "Go Giants!") provided by user 310 (e.g., to express that user 308 is rooting for a particular sports team). The shared content displayed in augmentation overlay 310 in FIG. 3 is illustrative only. In other examples, the shared content may include any other content that has been provided by user 308 for sharing by augmentation system 100. For example, the shared content could indicate interests, hobbies, friends, and/or other information about user 308.

Augmentation system 100 may select the specific shared content for display in augmentation overlay 310 based on any suitable factors, including sharing policies selected by user 308 and/or permissions of the user of device 302. For example, user 308 may indicate to augmentation system 100 that the shared content shown in FIG. 3 is to be shared generally with all users of augmentation system 100. Accordingly, because the user of device 302 is a user of augmentation system 100, augmentation system 100 may select the shared content displayed in FIG. 3 to be displayed as an augmentation to imagery captured by device 302. User 308 may alternatively or additional provide shared content to augmentation system 100 and designate the shared content to have different sharing policies, such as policies indicating that the shared content is part of a personal profile of user 308 and to be shared only with personal contacts of user 308, policies indicating that the shared content is part of a work profile of user 308 and to be shared only with coworkers of user 308, policies indicating that the shared content is part of a family profile of user 308 and to be shared only with family members, policies indicating that the shared content is to be shared only with certain users of augmentation system 100 and/or only when certain sharing criteria are satisfied (e.g., only at a particular location), etc.

Figure 4:
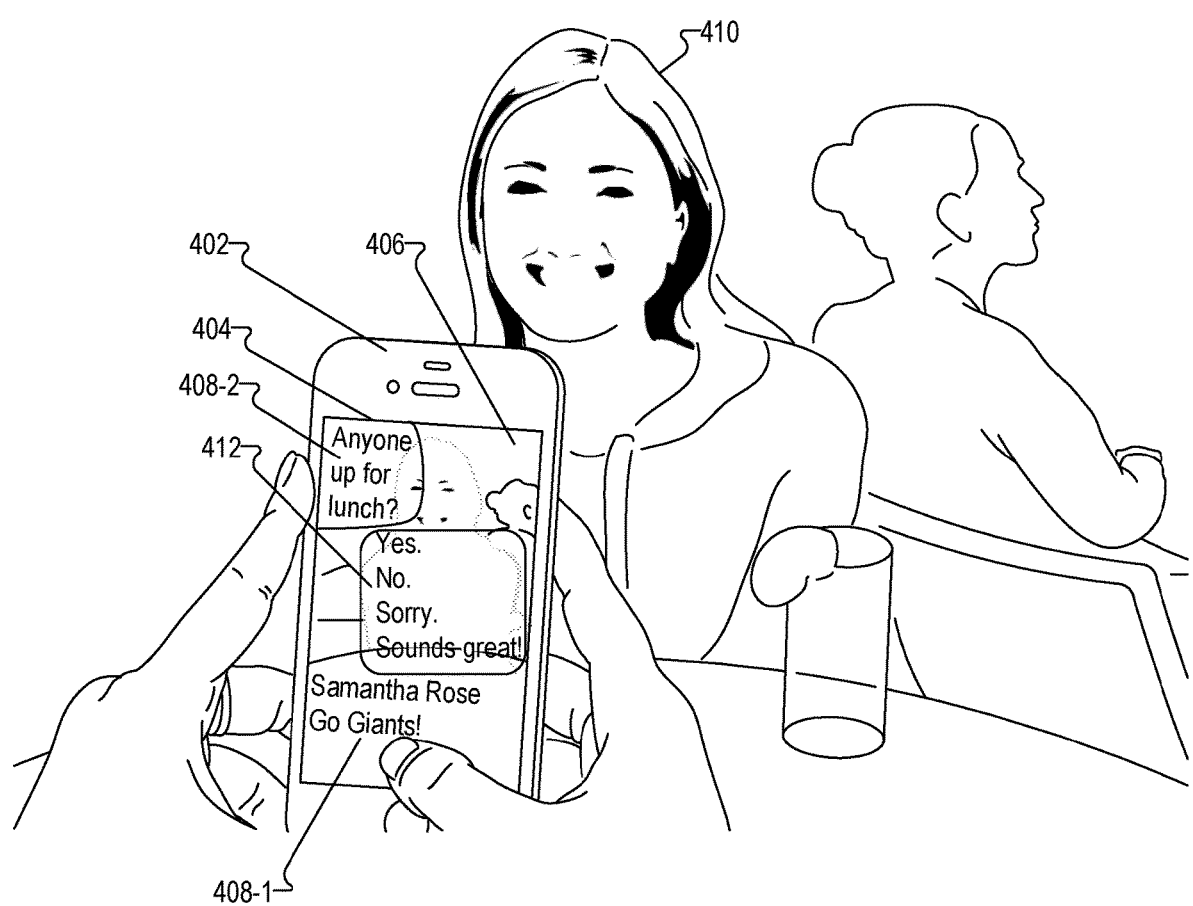
FIG. 4 illustrates an exemplary device presenting multiple augmentation overlays for imagery captured by a camera of the device according to principles described herein.

If the user of device 302 has additional permissions for accessing shared content provided by user 308, augmentation system 100 may display different or additional shared content as an augmentation to imagery captured by device 302. For example, user 308 may provide additional shared content (e.g., an invitation to join user 308 for lunch) to augmentation system 100 and indicate that the additional shared content is to be shared only with members of a particular group of users of augmentation system 100, such as users of augmentation system 100 who have friend relationships with user 308 or who are coworkers of user 308. If the user of device 302 is within the particular group of users (e.g., is a friend or coworker of user 308), the user of device 302 is granted permission to access the additional shared content. Accordingly, augmentation system 100 may present the additional shared content as an augmentation to imagery captured by device 302. FIG. 4 illustrates an example of this.

FIG. 4 shows a device 402 including a display screen 404 displaying a graphical user interface view 406 that includes multiple augmentation overlays 408 (e.g., augmentation overlay 408-1 and augmentation overlay 408-2) for imagery captured by a camera of device 402. In some examples, device 402 may concurrently provide augmentation overlay 408-1 (representative of first shared content) along with augmentation overlay 408-2 (representative of second shared content) together with the captured imagery in the graphical user interface view 406 of display screen 404 of device 402.

In certain examples, augmentation system 100 may provide augmentation overlay 408-1 displaying the first shared content based on the first shared content being provided by a user 410 depicted in the imagery for general sharing with all other users of augmentation system 100. In addition, augmentation system 100 may provide augmentation overlay 408-2 displaying the second shared content based on the second shared content being provided by user 410 for sharing only with a particular group of users of augmentation system 100. The user of device 402 may be a member of the group. Accordingly, augmentation system 100 may present both the first shared content and the second shared content as augmentations to imagery captured by device 402.

In certain examples, the user of device 402 may initiate, in any suitable manner, a communication with user 410 depicted in the imagery. To illustrate, the user of device 402 may select one of the augmentation overlays 408, such as by touching augmentation overlay 408-2, which in turn may initiate an interaction with user 410 who provided the shared content represented in augmentation overlay 408-2. In certain examples, interaction between the users of devices 402 and 204 may be based on any suitable criteria including, but not limited to, user policy settings and filters. The communication between the user of device 402 and the user of device 204 may be provided through any suitable manner including, but not limited to, a network (e.g., network 206 of FIG. 2) and peer-to-peer communication. Additionally, the communication between the user of device 402 and the user of device 204 may be implemented by any suitable device including, but not limited to, an instant messaging facility (e.g., instant messaging facility 236 of FIG. 2).

In an example, augmentation system 100 may detect a user interaction with a displayed augmentation such as augmentation overlay 408-2 and, based on the user selection of augmentation overlay 408-2, augmentation system 100 may provide a feature configured to facilitate an interaction between the user of device 402 and the user depicted in the imagery captured by device 402. For example, augmentation system 100 may provide a set of selectable responses to the shared content represented by augmentation overlay 408-2. For instance, augmentation system 100 may provide a pop-up menu 412 that includes the set of selectable responses. The set of selectable responses in pop-up menu 412 may include, but are not limited to, an option to accept an invitation, an option to decline an invitation, an option to initiate a communication, and/or any other suitable option(s).

The example shown in FIG. 4 is illustrative only. Augmentation system 100 may be configured to provide any suitable features that allow a user to leverage shared content of an augmentation overlay to facilitate and/or enhance interaction between users, including by facilitating direct digital communications between the users.

FIG. 4 illustrates an example in which multiple augmentation overlays representing shared content provided by the same user are concurrently displayed with captured imagery. In other examples, multiple augmentation overlays representing shared content provided by different users may be concurrently displayed with captured imagery. In such examples, augmentation system 100 may provide one or more features to facilitate interaction between the users whose shared content is being displayed. For example, the user of the device displaying the imagery augmented with the shared content of the different users may include a feature provided by augmentation system 100 to facilitate, in any suitable manner, an introduction of the users to each other.

Figure 5:
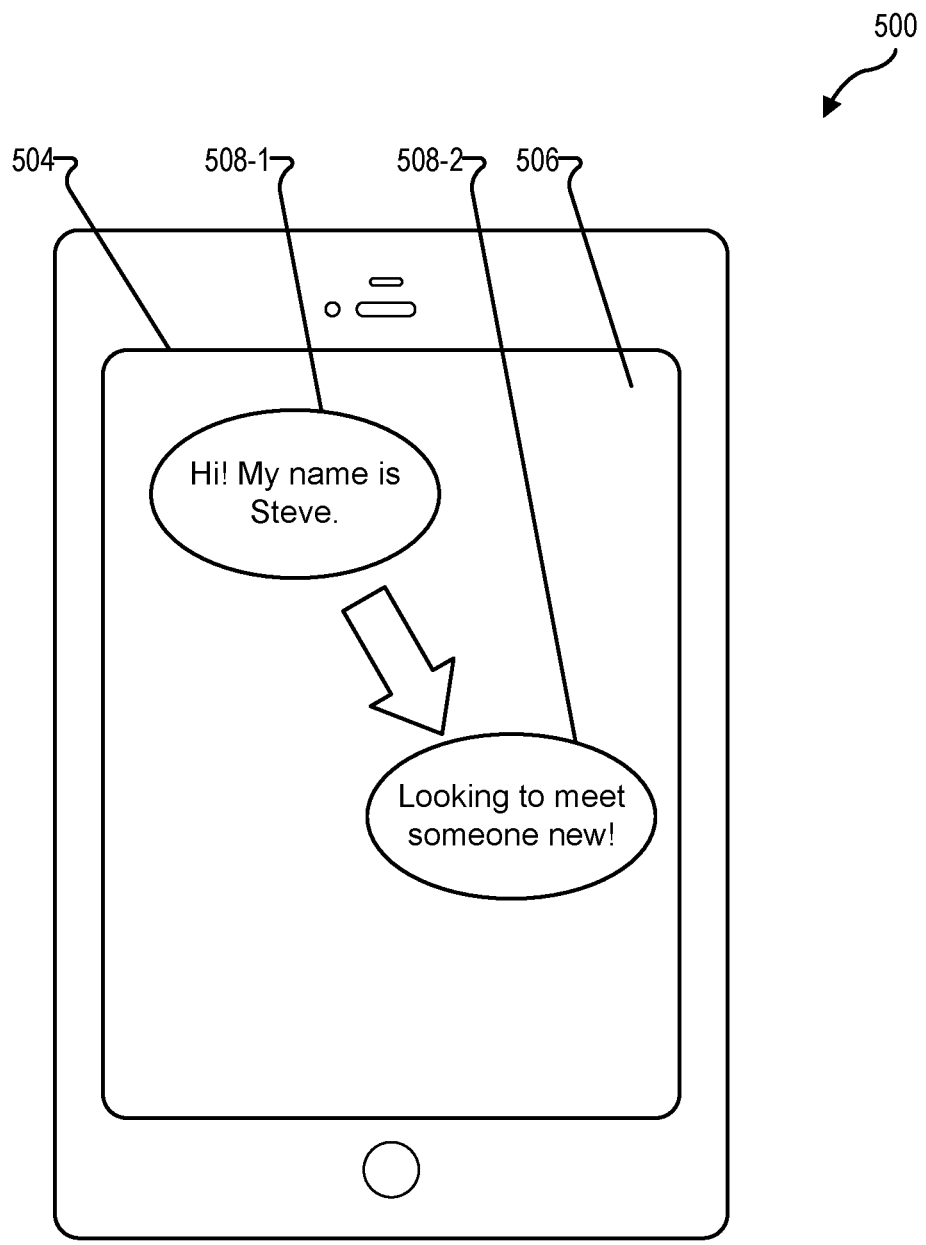
FIG. 5 illustrates an exemplary device presenting multiple augmentation overlays for imagery captured by a camera of the device according to principles described herein.

To illustrate, FIG. 5 shows an exemplary device 500 with a display screen 504 displaying a graphical user interface view 506 having multiple augmentation overlays 508 (e.g., augmentation overlay 508-1 and 508-2) displayed along with imagery captured by a camera of device 500. In an example, the user associated with device 500 may interact with augmentation system 100 to facilitate an introduction of the users to each other. For example, the user of device 500 may provide input (e.g., touch input) to drag one of the augmentation overlays into the other augmentation overlay (e.g., by dragging augmentation overlay 508-1 into augmentation overlay 508-2). Based on the augmentation overlays 508-1 and 508-2 being dragged into each other, augmentation system 100 may send a communication, in any suitable way, to each user associated with augmentation overlays 508-1 and 508-2 to facilitate an introduction and/or communications between the users. In an example, the introduction may include, but is not limited to, providing an exchange of contact information and an identification of something the users have in common.

In certain examples, augmentation system 100 may be configured to generate and provide one or more other views for display by a device such as device 204. In certain examples, such other views may include augmented camera-captured imagery and/or may be generated based on camera-captured imagery. Examples of other views that may be provided by augmentation system 100 will now be described.

In certain examples, a user may (while device 204 is executing application 208) switch camera 224 to a front-facing camera to view an augmentation overlay representing the shared content that has been provided by the user. In such a view, the shared content of the user may be displayed as an augmentation overlay to imagery depicting the user such that the user may see how his or her shared content will look to other users of augmentation system 100. Such a view may also contain an additional augmentation overlay for any other user of augmentation system 100 depicted in the imagery.

In certain examples, device 204 may display a split screen view to concurrently present augmentation overlays for imagery captured by multiple cameras. For example, part of the split-screen view may include an augmentation overlay on imagery captured by a rear-facing camera of device 204 and another part of the split-screen view may include an augmentation overlay on imagery captured by a front-facing camera of device 204.

In certain examples, augmentation system 100 may be configured to generate and provide one or more other display mode views for display by a device such as device 204. For example, augmentation system 100 may provide a map view that shows augmentation overlays representing shared content for users located within a geographic area represented by the map. As another example, augmentation system 100 may provide a map view showing a navigation route from the location of the device 204 to a location corresponding to a user who shared content that is represented by an augmentation overlay on the map. As another example, augmentation system 100 may provide a three-dimensional (3-D) map view that shows augmentation overlays representing shared content for users located within a building or other location. As another example, augmentation system 100 may provide a heat map view showing a density of activity and/or locations of users of augmentation system 100 within a geographic space. As another example, augmentation system 100 may provide an interview view and/or feature that allows the user of device 204 to search for shared content, users, etc. that matches search parameters.

Augmentation system 100 may be configured to generate and provide an augmented environment view. In certain examples, augmentation system 100 may generate the augmented environment view based on camera-captured imagery of a real-world environment and/or on locations of devices of users of augmentation system 100. The augmented environment view may be configured to indicate physical positions of the devices, users, and or other objects within an environment.

Figure 6:
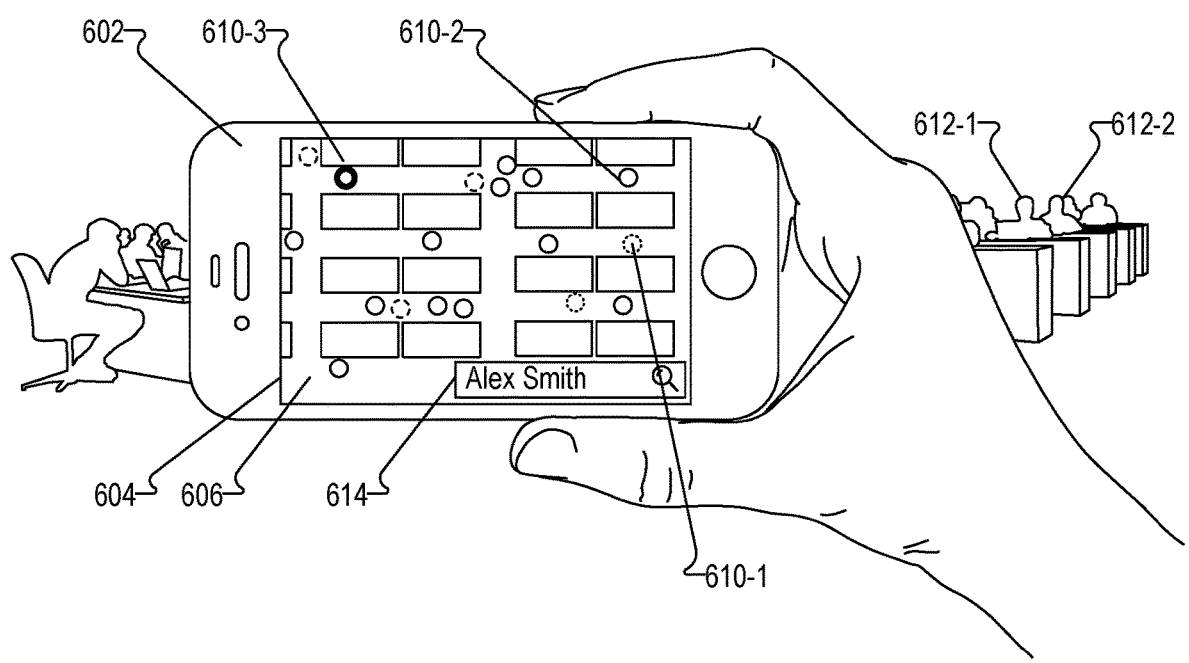
FIG. 6 illustrates an exemplary device presenting an augmented environment view generated based on imagery captured by a camera of the device according to principles described herein.

To illustrate, FIG. 6 shows an exemplary device 602 including a display screen 604 displaying an augmented environment view 606 representative of an environment captured by a camera of device 602. Augmentation system 100 may generate augmented environment view 606 in any suitable way and based on any suitable data. For example, augmentation system 100 may receive information from and/or about devices 204 of users located within the real-world environment and utilize this information along with other data (e.g., data representative of a physical layout of the environment) to generate augmented environment view 606. The information may include locations of devices 204 accessed from a location data store and/or locations of users determined based on imagery captured by the camera of device 602 (e.g., by determining depth values based on the imagery and using the depth values to determine locations of users and/or devices 204 of the users).

As shown in FIG. 6, augmented environment view 606 includes an overhead view of a layout of a workplace environment that includes an arrangement of workstations and people at the workstations. Augmentation system 100 may access a predefined overhead layout of the workplace and register the layout to the position and orientation of device 602 based on imagery captured by device 602 such that the overhead view of the layout of the workplace aligns with the position and orientation of device 602. Alternatively, augmentation system 100 may generate the overhead layout based on imagery captured by device 602.

As further shown in FIG. 6, augmented environment view 606 includes visual representations of the workstations and visual representations of the people at the workstations. In certain examples, the visual representations of the people at the workstations may include markers that represent locations of the users in the environment. Augmentation system 100 may determine locations of the people in any suitable way, including by using tracked locations of devices 602 and/or depictions of the people in imagery captured by device 602. To illustrate, augmented environment view 606 may include a layout of a workplace including markers 610 showing current locations of users 612 (e.g., a marker 610-1 showing the location of a user 612-1 and a marker 610-2 showing the location of a user 612-2).

Markers 610 may indicate any suitable information related to users 612 associated with markers 610. For example, the dashed outline of marker 610-1 may indicate that user 612-1 is currently unavailable, and the solid outline of marker 610-2 may indicate that user 612-2 is currently available. In additional or alternative examples, the status (e.g., available or unavailable) of a user 612 may also be represented by a marker 610 in any other suitable way including, but not limited to, color (e.g., one color for available and another color for unavailable) and a degree of visibility of marker 610.

In additional or alternative examples, augmented environment view 606 may include a search window 614 to enable the user of device 602 to search for another user within the environment. For example, the user of device 602 may input a name of a user within search window 614, and augmentation system 100 may determine in any suitable manner whether a device associated with the user indicated in the search window 614 is located within the environment. Based on the device associated with the searched-for user being located within the environment, augmentation system 100 may visually indicate a marker, such as marker 610-3 representative of the user in any suitable way including, but not limited to, marker 610-3 being highlighted, marker 610-3 blinking, and marker 610-3 changing color.

In certain examples, an augmented environment view such as augmented environment view 606 may be augmented with shared content provided by one or more users represented by markers in the augmented environment view. For example, for a particular user represented by a marker in the augmented environment view, augmentation system 100 may access and provide shared content associated with the user as an augmentation for the augmented environment view. The augmentation may be displayed with the augmented environment view in any suitable way, including as an augmentation overlay positioned proximate to the marker representing the user so as to visually indicate a correlation of the augmentation overlay to the marker. Accordingly, the user of device 602 may view the augmented environment view and see shared content associated with a user located in the environment. The shared content may include any form of shared content, including any of the examples of shared content described herein (e.g., a name and/or title of the user accessed from an active service directory of an enterprise). The shared content may help the user of device 602 to quickly locate a user in the environment and/or ascertain a current status of the user.

In certain examples, augmentation system 100 may be configured to provide an augmented environment view and/or shared content as an augmentation of an environment view and/or imagery captured by a device based on the device being locating within a particular predefined geographic location. For example, a place of business may be defined to be a geographic location, and augmentation system 100 may be configured to provide an augmented view for display by a device based on the device being located at the geographic location (e.g., within a geofence of the geographic location). For instance, augmented environment view 606 may be displayed by device 602 when device is located within the geographic location and imagery of the environment is being captured by a camera of device 602. In certain examples, augmentation system 100 may be configured to obscure certain imagery of the geographic location, which may be used to hide or protect proprietary information (e.g., proprietary business information at a workplace) from being displayed.

In certain examples, augmentation system 100 may be configured for use to promote products within a store. For example, based on one or more of devices 204 being located within a geographic location identified as a store, augmentation system 100 may provide one or more augmentation overlays for imagery captured by a camera 224 of the device 204. The user of the device 204 may utilize the augmentation overlays to view shared content, which shared content may indicate locations of products and/or deals.

Figure 7:
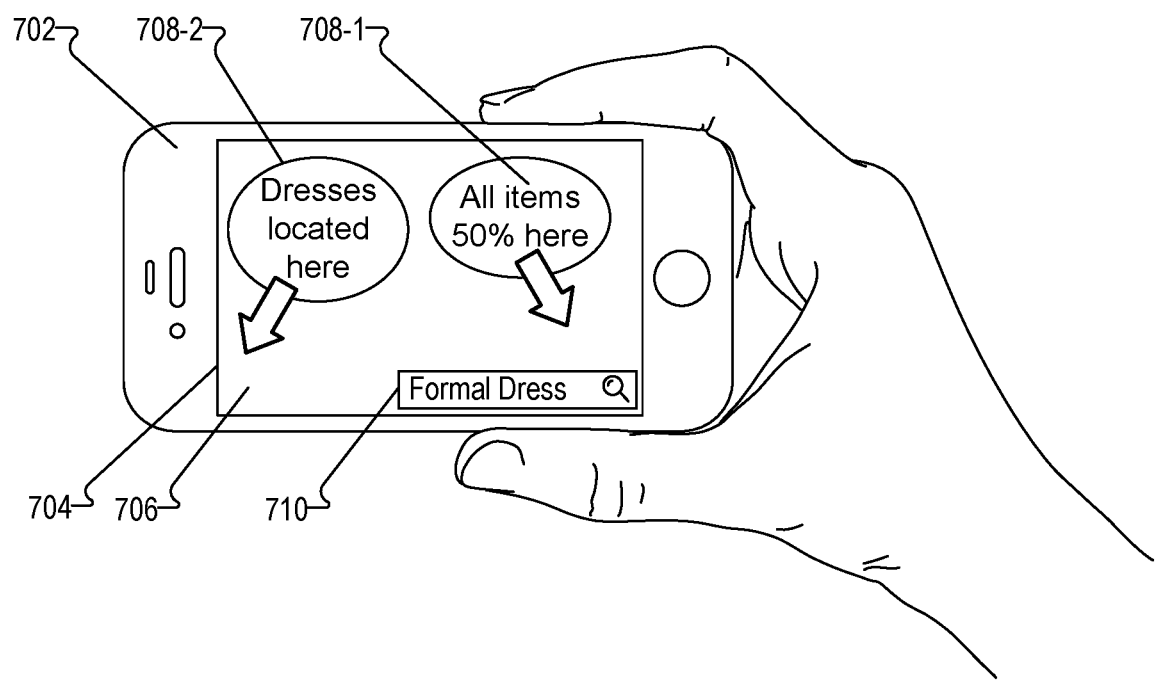
FIG. 7 illustrates an exemplary device presenting multiple augmentation overlays for imagery captured by a camera of the device within an enterprise environment mode according to principles described herein.

To illustrate, FIG. 7 shows an exemplary device 702 with a display screen 704 displaying a graphical user interface view 706 that includes imagery captured by a camera of device 702 augmented with augmentation overlays 708 (e.g., augmentation overlays 708-1 and 708-2). Augmentation overlays 708 may display shared content received from a user who is associated with a retail store. In an example, the shared content may represent any suitable information about the store including, but not limited to, locations of products, prices of products, discounts of products, and locations of sale items. Augmentation overlays 708 may be provided along with metadata identifying locations of products within the store.

In some examples, as a user scans device 702 over the store, imagery captured by a camera of device 702 may be displayed in graphical user interface view 706 along with one or more augmentation overlays 708. For example, augmentation overlay 708-1 may be displayed for imagery captured by the camera when a product associated with augmentation overlay 708-1 is depicted within the imagery. Augmentation overlay 708-1 may be visually linked to the associated product within the imagery in any suitable manner including, but not limited to, a line, an arrow, etc.

In certain examples, graphical user interface view 706 may include a search window 710 configured for use by the user of device 702 to search for one or more products within the store. For example, the user may input a product name or type of product within search window 710 and augmentation system 100 may determine whether the product or type of product is located within the store. Based on the product being located within the store, an augmentation overlay 708 (e.g., augmentation overlay 708-2) made be provided to identify a location of the searched for product.

In certain examples, augmentation system 100 may be configured to identify any suitable target item depicted within imagery captured by a camera 224 of device 204. Based on the identification of the item, augmentation system 100 may provide shared content associated with the item as an augmentation overlay for the imagery captured by camera 224 of device 204. In an example, the item may include, but is not limited to, a set of keys, a watch, a wallet, and an appliance. The shared content associated with item may include the location of the item, a status of the item (e.g., the temperature of a refrigerator or a freezer, a dishwasher has completed its cycle, a filter needs to be replaced), and/or any other information about the item.

While certain examples of shared content as augmentation of camera-captured imagery have been described herein, the reader will understand that systems, methods, and principles described here may be applied to a variety of use cases and/or implementations. Shared content represented within augmentation overlays may include any suitable content, including the examples described herein and other examples not described herein. Additional examples of shared content include, but are not limited to, a query, an estimated time of arrival (ETA), a video clip, a mobile payment, and a venue rating.

In certain examples, augmentation system 100 may be configured to allow a user at a location to provide shared content and designate that shared content to be associated with that location. For example, the user may utilize a device 204 to capture a video clip at that location. The user may publish the video clip as shared content for other users to view as an augmentation overlay for captured imagery at that location. Accordingly, even after the user has left the location and is not located there, another user of augmentation system 100 may visit the location and use his or her device 204 to capture imagery at the location. In response, augmentation system 100 may provide the shared content left behind by the user (e.g., as a "bread crumb") as an augmentation of the imagery being captured by the device 204 of the other user at the location.

In certain examples, augmentation system 100 may be configured to allow a user to create shared content in the form of a digital recon element and designate the recon element as being associated with a location at which the user is not located. Augmentation system 100 may send the recon element to the location such that recon element may gather information about the location from one or more users of augmentation system 100 who are at the location. To illustrate, a first user may send a recon element to a location at which the user is not located. Another user who is located at the location may use a device 204 to capture imagery of the location. Augmentation system 100 may access the imagery being captured at the location and map it to the recon element such that the imagery may be displayed within the recon element by the device 204 of the first user. Accordingly, the first user may see, via the imagery in the recon element, what is happening at the location even though the first user is not at the location.

In certain examples, the first user in the example described above may want to pay for something for the other user at the location. The first user may create shared content such as a recon element and push a payment through a secure payment application and the recon element even though the first user is not located at that location. For example, the first user may be a parent who uses a recon element, through augmentation system 100, to remotely pay for something (e.g., an entrance fee) for a child at the location.

In any of the ways described herein, a user of augmentation system 100 may utilize an appropriately configured device 204 to share content (e.g., by selectively broadcasting shared content) from device 204, to other users of augmentation system 100, for presentation as an augmentation of imagery captured by devices of the other users of augmentation system 100. Accordingly, the other users may experience an augmented reality that includes reality augmented with shared content provided by the user of augmentation system 100.

Figure 8:
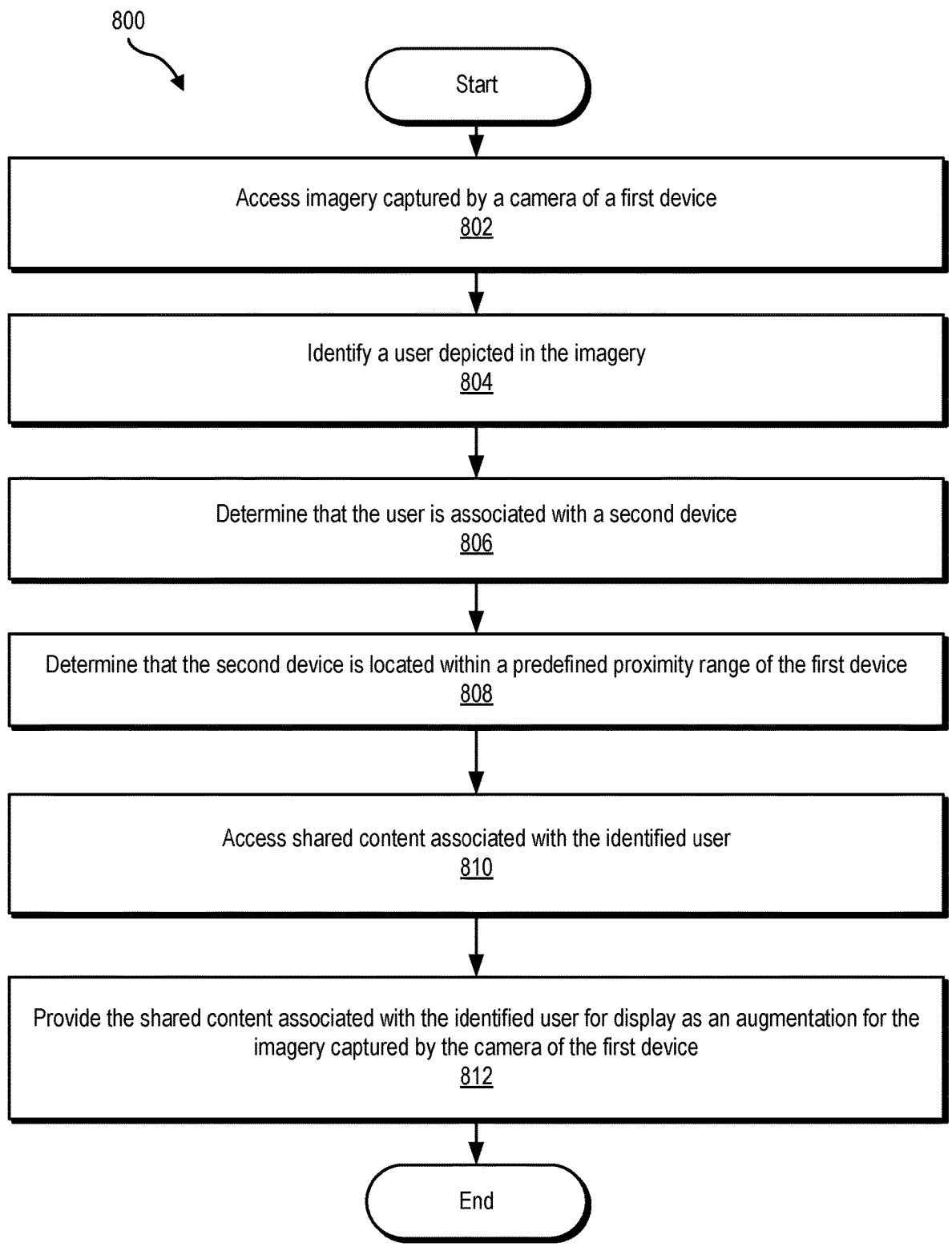
FIG. 8 illustrates an exemplary method of proximity-based content sharing as an augmentation for imagery captured by a camera of a device according to principles described herein.

FIG. 8 illustrates an exemplary method 800 of proximity-based content sharing as an augmentation for imagery captured by a camera of a device. While FIG. 8 illustrates exemplary operations according to one embodiment, other embodiments may omit, add to, reorder, and/or modify any of the operations shown in FIG. 8. One or more of the operations shown in FIG. 8 may be performed by augmentation system 100, any components included therein, and/or any implementation thereof.

In operation 802, an augmentation system accesses imagery captured by a camera of a first device. Operation 802 may be performed in any of the ways described herein.

In operation 804, the augmentation system identifies a user depicted in the imagery. Operation 804 may be performed in any of the ways described herein. In one example, the augmentation system may identify the user based on the imagery captured by the camera of the first device. For example, the augmentation system may execute a machine learning model such as a trained neural network to identify the user depicted in the imagery captured by the camera of the first device.

In operation 806, the augmentation system determines that the user is associated with a second device. Operation 806 may be performed in any of the ways described herein.

In operation 808, the augmentation system determines that the second device is located within a predefined proximity range of the first device. Operation 808 may be performed in any of the ways described herein.

In operation 810, the augmentation system accesses shared content associated with the identified user. Operation 810 may be performed in any of the ways described herein.

In operation 812, the augmentation system provides the shared content associated with the identified user for display as an augmentation for the imagery captured by the camera of the first device. Operation 812 may be performed in any of the ways described herein.

In certain examples, operations 810 and 812 may be performed by the augmentation system based on the identified user being depicted in the imagery and the second device being located within the predefined proximity range of the first device. This may help facilitate sharing and experiencing of content at a common geographic location and/or at a common time, which may facilitate and/or enhance in-person interaction between users of the augmentation system.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer may read.

Figure 9:
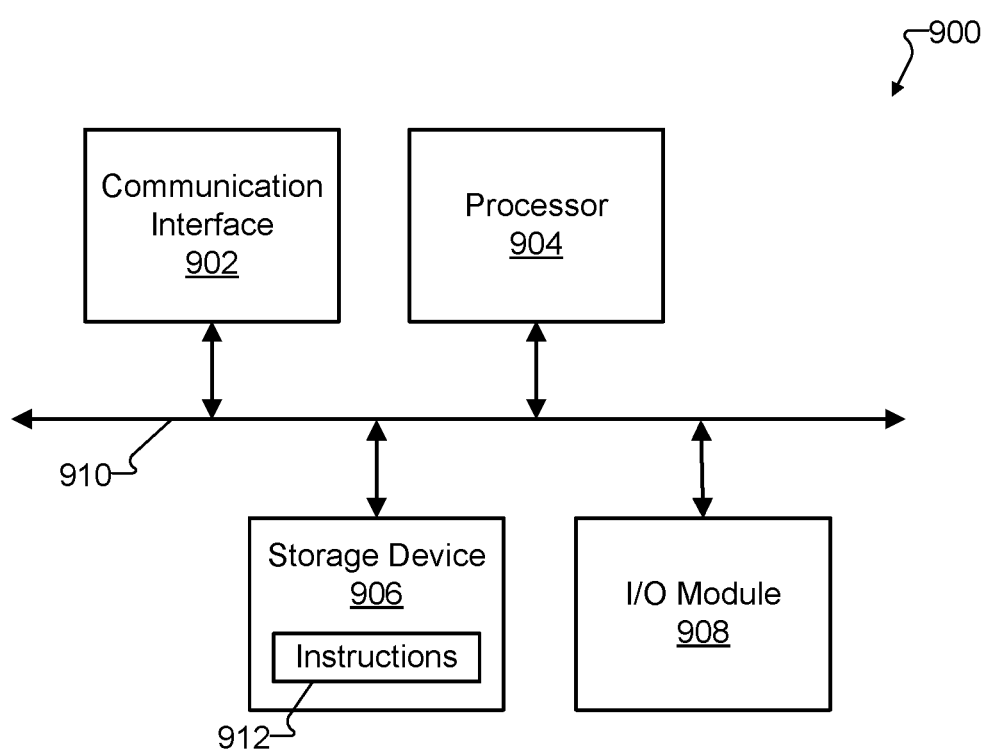
FIG. 9 illustrates an exemplary computing device according to principles described herein.

FIG. 9 illustrates an exemplary computing device 900 that may be specifically configured to perform one or more of the processes described herein. As shown in FIG. 9, computing device 900 may include a communication interface 902, a processor 904, a storage device 906, and an input/output ("I/O") module 908 communicatively connected via a communication infrastructure 910. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data or interpreting, executing, and/or directing execution of one or more of the instructions, processes, and/or operations described herein. Processor 904 may direct execution of operations in accordance with instructions 912 (e.g., one or more applications or other computer-executable instructions) such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 906. For example, data representative of executable instructions 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. One or more I/O modules may be used to receive input for a single virtual experience. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 900. For example, instructions 912 residing within storage device 906 may be configured to direct processor 904 to perform one or more processes or functions associated with processing facility 104 of augmentation system 100 and/or system configuration 200 of augmentation system 100. Likewise, storage facility 102 of augmentation system 100 may be implemented by or within storage device 906.

To the extent the aforementioned embodiments collect, store, and/or employ personal information provided by users, it should be understood that such information shall be used in accordance with all applicable laws concerning protection of personal information. Additionally, the collection, storage, and use of such information may be subject to consent of the user to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   accessing, by an augmentation system, imagery captured by a sensor of a first device;
   identifying, by the augmentation system, a plurality of users depicted in the imagery;
   determining, by the augmentation system, that a first user included in the plurality of users is associated with a second device and that a second user included in the plurality of users is associated with a third device;
   determining, by the augmentation system, that the second device and the third device are located within a predefined proximity range of the first device;
   providing, by the augmentation system based on the plurality of users being depicted in the imagery and the second device and the third device being located within the predefined proximity range of the first device, shared content associated with the identified plurality of users for display as an augmentation for the imagery captured by the sensor of the first device;
   determining, by the augmentation system, that the first device is located within a particular geographic location; and
   generating, by the augmentation system and based on the imagery captured by the sensor of the first device and on the first device being located within the particular geographic location, an augmented environment view for display by the first device, the augmented environment view including a plurality of markers representing current locations of users included in the plurality of users within the particular geographic location, the plurality of markers including:
      a first marker indicating that the first user represented in the augmented environment view is available based on the first user's usage of an application installed on the second device; and
      a second marker indicating that the second user represented in the augmented environment view is not available based on the second user's usage of the application installed on the third device,
   wherein the first marker is visually different than the second marker.

2. The method of claim 1, wherein the determining that the second device is located within the predefined proximity range of the first device comprises:
   determining, by the augmentation system and based on data from a location data store, a location of the first device and a location of the second device; and
   determining, by the augmentation system, that a distance between the location of the first device and the location of the second device is within the predefined proximity range.

3. The method of claim 1, wherein the determining that the second device is located within the predefined proximity range of the first device comprises:
   determining, by the augmentation system and based on depth data associated with the imagery, a distance between the first device and the second device; and
   determining, by the augmentation system, that the distance is within the predefined proximity range of the first device.

4. The method of claim 1, wherein the shared content associated with the identified plurality of users is provided by the identified plurality of users and stored in a data store prior to the second device and the third device being located within the predefined proximity range of the first device.

5. The method of claim 1, further comprising accessing, by the augmentation system, the shared content associated with the identified plurality of users,
   wherein the accessing of the shared content associated with the identified plurality of users comprises receiving, via the augmentation system, the shared content associated with the identified plurality of users from the second device and the third device.

6. The method of claim 1, wherein the providing, by the augmentation system, of the shared content associated with the identified plurality of users for display is performed in response to determining that a user associated with the first device is authorized to receive the shared content associated with the identified plurality of users.

7. The method of claim 1, further comprising:
   providing, by the augmentation system, in response to detecting a user interaction with the displayed augmentation, a feature, on the first device, configured to facilitate a communication between a user of the first device and the first user and the second user.

8. The method of claim 1, wherein the first marker visually depicts a first state of use of the application and the second marker visually depicts a second state of use of the application.

9. The method of claim 1, wherein the augmented environment view is an overhead view of a layout of the particular geographic location.

10. The method of claim 1, wherein:
    the imagery captured by the sensor of the first device is captured from a first field of view of the particular geographic location; and
    the augmented environment view is provided for display as viewed from a second field of view that is different than the first field of view.

11. A system comprising:
    at least one memory storing instructions; and
    at least one processor communicatively coupled to the at least one memory and configured to execute the instructions to:
       access imagery captured by a camera of a first device;
       identify a plurality of users depicted in the imagery;
       determine that a first user included in the plurality of users is associated with a second device and that a second user included in the plurality of users is associated with a third device;
       determine that the second device and the third device are located within a predefined proximity range of the first device;

provide, based on the plurality of users being depicted in the imagery and the second device and the third device being located within the predefined proximity range of the first device, shared content associated with the identified plurality of users for display as an augmentation for the imagery captured by the camera of the first device;

determine that the first device is located within a particular geographic location; and generate, based on the imagery captured by the camera of the first device and on the first device being located within the particular geographic location, an augmented environment view for display by the first device, the augmented environment view including a plurality of markers representing current locations of the plurality of users within the particular geographic location, the plurality of markers including:

a first marker indicating that the first user represented in the augmented environment view is available based on the first user's usage of an application installed on the second device; and a second marker indicating that the second user represented in the augmented environment view is not available based on the second user's usage of the application installed on the third device, wherein the first marker is visually different than the second marker.

12. The system of claim 11, wherein the determining that the second device is located within the predefined proximity range of the first device comprises:

determining, based on data from a location data store, a location of the first device and a location of the second device; and determining that a distance between the location of the first device and the location of the second device is within the predefined proximity range.

13. The system of claim 11, wherein the determining that the second device is located within the predefined proximity range of the first device comprises:

determining, based on depth data associated with the imagery, a distance between the first device and the second device; and determining that the distance is within the predefined proximity range of the first device.

14. The system of claim 11, wherein the shared content associated with the identified plurality of users is provided by the identified plurality of users and stored in a data store prior to the second device and the third device being located within the predefined proximity range of the first device.

15. The system of claim 11, wherein:

the at least one processor is further configured to execute the instructions to access the shared content associated with the identified plurality of users; and the accessing of the shared content associated with the identified plurality of users comprises requesting and receiving the shared content associated with the identified plurality of users from the second device and the third device.

16. The system of claim 11, wherein the at least one processor is further configured to execute the instructions to determine whether a user associated with the first device is authorized to receive the shared content associated with the identified plurality of users.

17. The system of claim 11, wherein the at least one processor is further configured to execute the instructions to:

access second imagery captured by a second camera of the first device;

identify a user of the first device as being depicted in the second imagery;

access, based on the user of the first device being depicted in the second imagery, shared content associated with the user of the first device; and provide the shared content associated with the user of the first device for display as an augmentation for the second imagery captured by the second camera of the first device.

18. The system of claim 11, wherein the at least one processor is further configured to execute the instructions to:

detect a user interaction with the displayed augmentation; and provide, in response to the detecting of the user interaction with the displayed augmentation, a feature configured to facilitate an interaction between the plurality of users depicted in the imagery captured by the camera of the first device and a user of the first device.

19. A non-transitory computer-readable medium storing instructions that, when executed, direct at least one processor of a computing device to:

access imagery captured by a camera of a first device;

identify a plurality of users depicted in the imagery;

determine that a first user included in the plurality of users is associated with a second device and that a second user included in the plurality of users is associated with a third device;

determine that the second device and the third device are within a predefined proximity range of the first device;

provide, based on the plurality of users being depicted in the imagery and the second device and the third device being within the predefined proximity range of the first device, shared content associated with the identified plurality of users for display as an augmentation for the imagery captured by the camera of the first device;

determine that the first device is located within a particular geographic location; and generate, based on the imagery captured by the camera of the first device and on the first device being located within the particular geographic location, an augmented environment view for display by the first device, the augmented environment view including a plurality of markers representing current locations of users included in the plurality of users within the particular geographic location, the plurality of markers including:

a first marker indicating that the first user represented in the augmented environment view is available based on the first user's usage of an application installed on the second device; and a second marker indicating that the second user represented in the augmented environment view is not available based on the second user's usage of the application installed on the third device, wherein the first marker is visually different than the second marker.

20. The computer-readable medium of claim 19, wherein the instructions, when executed, further direct the at least one processor of the computing device to:

detect a user interaction with the displayed augmentation; and provide, in response to the detecting of the user interaction with the displayed augmentation, a feature configured to facilitate an interaction between the plurality of users depicted in the imagery captured by the camera of the first device and a user of the first device.

* * * * *